Dec. 5, 1961 W. H. BACH 3,012,105

METHOD AND APPARATUS FOR MIXING AND RECORDING MULTIPLE SOUND SIGNALS

Filed Oct. 17, 1955

INVENTOR.
WALTER H. BACH
BY Fulwider Mattingly & Huntley
ATTORNEYS 3,012,105

METHOD AND APPARATUS FOR MIXING AND RECORDING MULTIPLE SOUND SIGNALS

Walter H. Bach, Los Angeles, Calif., assignor to Berndt-Bach, Incorporated, Los Angeles, Calif., a corporation of California Filed Oct. 17, 1955, Ser. No. 540,806
7 Claims. (Cl. 179—100.2)

The present invention relates generally to sound recording and more particularly to methods and apparatus for producing a composite sound record from a plurality of different sound signals. While the present invention has particular usefulness and application to motion picture sound recording, it will be appreciated by those skilled in the art that it has other uses in the sound recording art generally. The following illustrative example will show and describe the invention as embodied in an editing device for sound motion picture film.

The sound track of practically all commercially produced motion picture films includes not only a primary sound signal which is synchronized with the action depicted in the motion picture sequence, but also includes one or more secondary background sound signals which may be, for example, music, superimposed synthetic "street noises," commentary, background conversation, and the like. It is the customary practice when producing finished commercial motion picture films to produce the composite sound track by mixing several separate sound signals in an appropriate mixing circuit and recording the composite signal on the final sound track. This is a fairly complex and difficult operation, particularly when the sound track is produced optically. The mixing must be carefully done in order to maintain at all times throughout the sequence the appropriate proportional volumes as between the principal signal synchronized with the picture sequence and the background signal. Thus the operation often requires the making of several test films and the running of the master film through a projector while the composite sound signal is mixed and produced on a separate sound record. Also it is usually necessary in such cases, initially to record all sound signals including the primary signal on separate sound records independent of the motion picture film.

The advent and development of so-called "single system" amateur sound motion pictures and the production by single system cinematography of so-called "shorts" for use in television broadcasting has brought with it the need for a simple and effective method of editing and producing finished sound motion picture films having the aforementioned composite sound track.

With the foregoing in mind it is a major object of the present invention to provide a simple and effective method and apparatus for producing composite sound tracks from a plurality of different sound signals.

It is another object of the invention to provide a method and apparatus of the class described which is particularly adapted for use with reversal type motion pictures of the type in which a single film is used as a negative, receives the sound track, and is thereafter photographically reversed for use as a projection positive.

It is still another object of the invention to provide sound editing method and apparatus for use in connection with so-called "single system" sound motion picture recording wherein the sound track is produced on the same film as the picture, during the taking of the motion picture sequence.

It is yet another object of the invention to provide a method and apparatus of the class described which is readily adaptable for use with conventional projecting equipment and does not require auxiliary sound recording means not directly connected with the producing and projecting of the sound motion picture.

The foregoing and additional objects and advantages of the invention will appear from the following detailed description of one presently preferred embodiment thereof, consideration being given also to the attached drawings in which.

Figures 1, 2, 2A, 3, 4, 5, 6, 7:
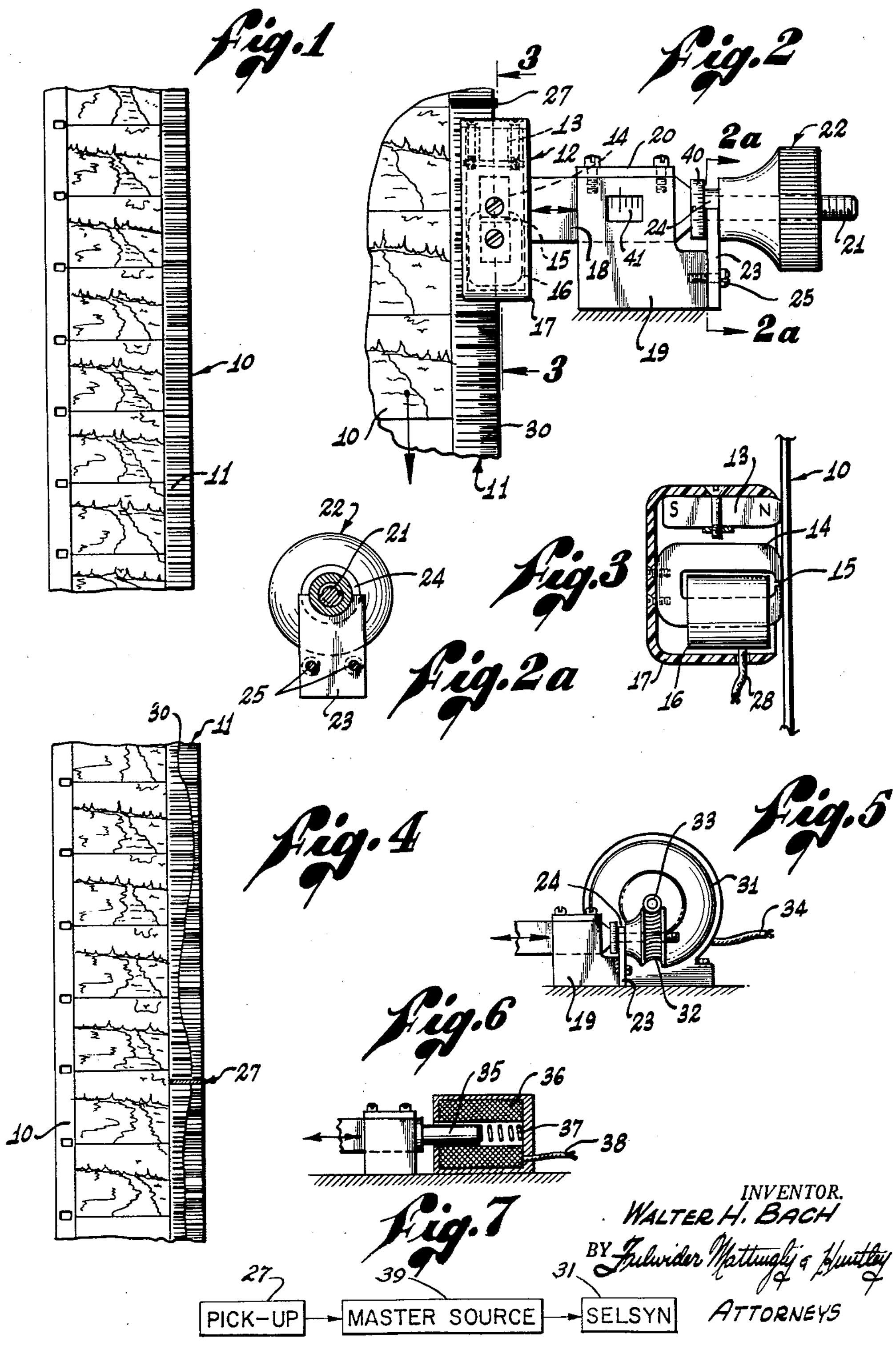
FIGURE 1 is an enlarged, partially schematic elevational view of a 16 mm. sound film produced by conventional methods.
FIGURE 2 is an enlarged elevational view of editing apparatus constructed according to the present invention.

FIGURE 2*a* is a cross sectional view of FIGURE 2 taken from cross-sectional lines 2*a*—2*a*;

FIGURE 3 is an elevational section taken on the line 3—3 of FIGURE 2;

FIGURE 4 is a further enlarged elevational view of the film shown in FIGURE 1 after passing through the editing apparatus illustrated in FIGURE 2;

FIGURE 5 is one alternate form of the apparatus illustrated in FIGURE 2;

FIGURE 6 is another alternate form of the apparatus shown in previous figures; and FIGURE 7 is a block diagram showing the system for adjusting the recording head.

Throughout the drawings, a 16 mm. sound motion picture film is indicated by the reference character 10, the same having a stripe 11 of magnetic material coated on the film in the sound track area. Magnetically sound striped films being known in the art, no further detailed description thereof is deemed necessary herein. Suffice it to say that the stripe of magnetic material does not in any way interfere with the photographic process and may therefore be applied to the film prior to exposure, whereby it may be used in single system photography, that is a system in which the sound track is recorded on the film at the same time that the motion picture sequence is being photographed on the same negative that carries the sound track.

The section of film illustrated in FIGURE 1 has been exposed, the synchronized sound signal has been recorded on the sound track 11 and the film has been developed and photographically reversed so that it is in condition for projection. It will be realized, of course, that the sound impulses making up the sound signal in the track 11 are not actually visible, although the same have been shown herein for illustrative purposes as horizontal striations of a variable density sound track. It will also be noted that the total recorded sound energy, i.e., the amplitude of the sound varies as the width of the sound track. This fact is made use of in the present invention as will be explained.

The film 10 if projected in a conventional sound projector would, of course, produce an intelligible, synchronized sound motion picture, the sound reproduced being that which was recorded at the time of taking the picture. However, many portions of such a sound signal recorded during the taking of most motion pictures, particularly news events and similar unrehearsed sequences, are undesirable or unnecessary. Furthermore, it is usually desired in connection with news sequences, travelogues, and similar short subject films, to superimpose commentary on the sound track explaining certain parts of the picture sequence. Still further, it is often desired to superimpose background music on the recorded sound signal.

In the present instance the composite sound track of the type just described is produced by passing the film 10 through an editing apparatus including a conventional projector such as a moviola and a laterally movable secondary sound recording head 12 as shown in FIGURE 2. Projectors for editing motion picture film are well known in the art and thus no detailed description is deemed necessary herein. The head 12 is mounted in the projector, close to the conventional sound pick-up indicated at 27 in FIGURE 2. The longitudinal displacement of the sound pick-up 27 and the effective sound recording gap of the head 12 is slight and the time delay between the two negligible.

The head 12 may include an erasing magnet 13 shown schematically in the present instance as a permanent magnet, although it will be realized that electro-magnetic erasing means of a conventional type may be used. The film 10 passes downwardly through the editing apparatus as indicated by the arrow in FIGURE 2 whereby the sound track 11 passes first the pick-up 27, then the erasing magnet 13, and finally a recording head core 14 of more or less conventional design having a sound recording gap at 15 wherein fluctuating magnetic impulses are produced by a coil 16 according to conventional magnetic sound recording practice forming a variable density recorded sound track.

As is shown in FIGURE 2, the erasing magnet 13 and the recording head core 14 are mounted in a housing 17 and the magnet 13 is vertically aligned with the gap 15 whereby to clear a lateral portion of the sound track immediately ahead of the recording gap 15. The housing 17 is mounted for adjustable, lateral movement with respect to the sound track 11, such movement being indicated by a double-headed arrow in FIGURE 2 and the limits of the movement being such that the magnet-recording head combination may be moved clear off of the sound track to the right or alternatively moved to the left so as to extend entirely across the sound track 11.

The adjustable mounting for accomplishing this movement of the housing 17 includes a rectangular support bar 18 secured to the housing 17 and extending to the right therefrom into a suitable guide or way 19 wherein it is retained by a cover plate 20. Lateral adjustment of the housing 17 is accomplished, in the form shown in FIGURE 2, by a threaded extension 21 at the right-hand end of the bar 18 which receives an internally threaded adjustment nut 22 supported against lateral movement by a yoke member 23 received in an annular groove 24 in the nut. The yoke 23 is secured to the right-hand end of the guide member as shown at 25.

Thus the nut 22 may be manually rotated, forcing the screw-threaded extension 21 and hence the bar 18 to the left or the right, depending on the direction of rotation of the nut.

In carrying out the present invention, the editing apparatus illustrated in FIGURE 2 is, as above stated, mounted in a conventional sound projector as close as practicable to the sound pick-up head 27. The desired secondary sound signal to be superimposed on the primary signal on the sound track 11 is then fed to the recording head coil 16 through leads 28 in a conventional manner. The operator then watches the motion picture sequence projected from the film 10 and at the same time listens to the reproduced sound from the track 11, the same being picked up at the point 27 indicated in FIGURE 2. As the projected motion picture sequence progresses, the operator manipulates the nut 22 so as to move the housing 17 to the left when it is desired to increase the proportion of superimposed sound as compared to the primary signal, and to the right when it is desired to reduce the proportion of superimposed sound. In order that the initial position of the recording housing 17 in the track 11 may be established, scale marks may be provided on the structure as indicated at 40 and 41 in FIGURE 2.

The final result is illustrated in FIGURE 4. Here it will be seen that two sound tracks are produced in side-by-side abutting relationship in the sound stripe area 11. The line of juncture between the two sound tracks is indicated at 30 and it will be seen that this juncture line meanders back and forth across the sound stripe 11 whereby to change the proportionate ratio of original signal to superimposed signal at various points along the composite sound track.

The position of the sound reproducing head is again indicated schematically in FIGURE 4 at 27, and it will be seen that this pick-up head extends entirely across the sound stripe 11, thus picking up both the primary and secondary sound signals recorded therein. Accordingly, it will be seen that the relative proportionate amplitude of the two signals will change as the juncture line 30 meanders back and forth across the film.

In the foregoing discussion it was assumed that the amplitude of the originally recorded signal and the amplitude of the superimposed signal were substantially identical and that the variations in proportional amplitude of the reproduced signal were due solely to the position of the juncture line 30 in the sound track. It will be realized, however, that in addition to the lateral adjustment of the recording head 14 by means of the nut 22, the amplitude of the signal may be varied in a conventional manner at the same time. Thus, for example, where it is desired to eliminate portions of the originally recorded sound signal and leave a substantially silent track, the amplitude of the superimposed signal may be cut substantially to zero and the housing 17 moved to its left-hand limit, thus erasing the original signal, but superimposing no signal on the track.

The method just described may be practiced in many instances without the use of the erasing magnet 13. In some instances it is preferred to omit such magnet, particularly where the originally recorded signal is relatively weak. In such cases the original signal will remain as a background signal even in the area of the composite track to the right of the juncture line 30. The just described system may be used, for example, in editing newsreels and the like wherein the final sound track is principally commentary, but some local background noise remains in all portions of the finally recorded composite sound sequence.

In some instances it may be desired to adjust the lateral position of the recording head 14 automatically in response to an externally applied signal, for example, in dramatic sequences where it is desired to bring up background music during such portions of the film in which there is little or no amplitude of recorded sound in connection with the picture sequence. In such instances a selsyn motor 31 may be mounted adjacent the recording head mounting and the nut 22 replaced with a worm gear 32 meshed with a worm 33 on the shaft of the motor 31. The adjusting or modulating signal, as shown in FIGURE 7, may then be fed to the motor through leads 34 from a conventional master source 39 causing the recording head to move to the left or right as previously described. The master control furnishing the modulating signal to the motor 31 may include a conventional circuit responsive to the amplitude of the primary sound signal picked up at 27, thus providing automatic background suppression.

The response of the selsyn motor adjustment in the form shown in FIGURE 5 is relatively slow and, furthermore, requires a multiconductor signal cable 34 and a fairly complicated master control (not shown). Where a more rapid response and/or simpler control system is desired, a solenoid may be used to move the recording head as shown in FIGURE 6. Here it will be seen that the threaded extension 21 is replaced by a solenoid core 35 which may be urged to the right by energizing a coil 36 and is urged to the left by a compression spring 37. The modulating or head shift control signal is fed to the coil 36 through conductor 38 from a suitable variable voltage source (not shown).

While the forms of the devices shown and described herein are fully capable of achieving the objects and providing the advantages hereinbefore stated, it will be realized that they are capable of some modification without departure from the spirit of the invention. For this reason, I do not mean to be limited to the form shown and described, but rather to the scope of the appended claims.

I claim:

1. Apparatus for superimposing a secondary sound track on a primary sound track of predetermined width recorded in a stripe of sound recording medium, comprising: means to move said stripe longitudinally; recording head comprising attachment means and magnetic gap structure mounted in fixed position in relation thereto, operative to record variable signals and being positioned adjacent said stripe and responsive to an audio-frequency electric signal to record a secondary sound track in a variable portion of the width of said stripe, said secondary sound track being laterally bound at one edge by an edge of said stripe; and adjusting means fixed to the attachment means independent of said signal to move said recording head transversely to vary the width of said secondary sound track.

2. Apparatus for recording sound in a moving sound receiving stripe of predetermined width comprising in combination: a sound recording head comprising attachment means and magnetic gap structure mounted in fixed position in relation thereto, said head being adapted to receive fluctuating electric signals and to produce in said stripe a sound track in accordance with said signals and having a variable width which is at least a substantial fraction of said predetermined width; mounting means for said head fixed to the attachment means and supporting the head in operative position adjacent and overlying an edge of said stripe to produce a sound track along said edge of said stripe as the same is moved; and adjustment means for said mounting means operable independently of said signals to move said head transversely with respect to said edge whereby to vary the amount by which said head overlies said stripe and thereby vary the width of the sound track produced in said stripe.

3. Apparatus for superimposing a secondary magnetic sound track on a primary magnetic sound track of predetermined width comprising in combination: means to move said primary track longitudinally; a magnetic sound recording head comprising attachment means and magnetic gap structure mounted in fixed position relative thereto, said head being adapted to receive a fluctuating electric signal and convert the same into fluctuating magnetic impulses whereby to record a variable width secondary track in the material of said primary track; mounting means fixed to the attachment means for supporting the head in operative position laterally overlapping a portion of said primary sound track to produce a secondary sound track in said material as the same is moved longitudinally; and adjustment means for said mounting means independent of said electric signal to move said head laterally with respect to said edge whereby to vary the amount by which said head overlaps said first sound track and thereby vary the relative proportionate widths of said sound tracks progressively along the same.

4. Apparatus for superimposing a secondary magnetic sound track on a primary magnetic sound track of predetermined width comprising in combination: means to move said primary track longitudinally; a magnetic sound recording head adapted to record a variable width secondary superimposed track in the material of said primary track; mounting means for said head supporting the same in operative position adjacent said primary track and overlying an edge thereof to produce a sound track parallel to said primary sound track as the same is moved; adjustment means in said mounting means to move said head laterally with respect to said edge whereby to vary the amount by which said head overlies the primary sound track and thereby vary the relative proportionate widths of said sound tracks along the length thereof; and a magnetic erasing member longitudinally aligned with said recording head, ahead of the same, and mounted in said mounting means for transverse movement with said recording head whereby to clear a portion of the width of said primary sound track to receive said secondary sound track, said cleared portion exactly corresponding in width to said secondary track.

5. Apparatus for recording sound in a moving sound receiving stripe of predetermined width comprising in combination: a sound recording head comprising attachment means and magnetic gap structure mounted in fixed position in relation thereto, operative to record variable signals and being adapted to produce a sound track of a variable width in said stripe; mounting means fixed to the attachment means for supporting the said head in operative position adjacent an edge of said stripe to produce a sound track along the edge of said stripe as the same is moved; adjustment means for said mounting means to move said head transversely with respect to said stripe whereby to vary the relative proportionate width of the sound track with respect to said stripe; and actuating means for said adjusting means adapted to move said head as aforesaid in response to an external modulating signal.

6. Apparatus for superimposing a secondary sound track on a primary sound track of predetermined width comprising in combination: means to move said primary track longitudinally; a recording head adapted independently of any transverse movement thereof to record a secondary sound track superimposed on said primary sound track; mounting means for said head supporting the same in operative position adjacent said primary track and overlying an edge portion thereof; adjusting means in said mounting means to move said head transversely with respect to said primary track whereby to vary the amount by which said head overlies said primary track and thereby vary the relative proportionate width of said secondary track along the length thereof; a sound pick-up positioned adjacent said primary track ahead of said recording head to pick up the sound signal recorded in said primary track; and control means operatively interconnected between said pick-up and adjusting means whereby to vary said secondary track width in accordance with said signal picked up from said primary track.

7. Apparatus for superimposing a secondary magnetic sound track on a primary magnetic sound track of predetermined width comprising in combination: means to move said primary track longitudinally; a magnetic sound recording head comprising attachment means and magnetic gap structure mounted in fixed position in relation thereto, operative to record variable signals on a secondary superimposed sound track on the existing signal of said primary track; mounting means fixed to the attachment means for supporting the head in operative position adjacent said primary track and overlying an edge thereof to produce a sound track parallel to said primary sound track as the same is moved; and adjustment means for said mounting means to move said head laterally with respect to said edge whereby to vary the amount by which said head overlies the primary sound track and thereby vary the relative widths of said sound tracks along the length thereof.

References Cited in the file of this patent

UNITED STATES PATENTS

| | | |
|---|---|---|
| 699,630 | Pedersen | May 6, 1902 |
| 1,828,444 | Rom | Oct. 20, 1931 |
| 1,979,937 | Jackman | Nov. 6, 1934 |
| 2,075,861 | Mueller | Apr. 6, 1937 |
| 2,402,095 | Slyfield | June 11, 1946 |
| 2,479,869 | Rossman et al. | Aug. 23, 1949 |
| 2,480,162 | Rath | Aug. 30, 1949 |
| 2,532,761 | De Blasio | Dec. 5, 1950 |
| 2,610,257 | Wissmann | Sept. 9, 1952 |
| 2,611,828 | Gunby | Sept. 23, 1952 |
| 2,615,989 | Thad | Oct. 28, 1952 |
| 2,628,288 | Blaney | Feb. 10, 1953 |
| 2,632,061 | Begun | Mar. 17, 1953 |
| 2,694,107 | Camras | Nov. 9, 1954 |